Patented Nov. 6, 1934

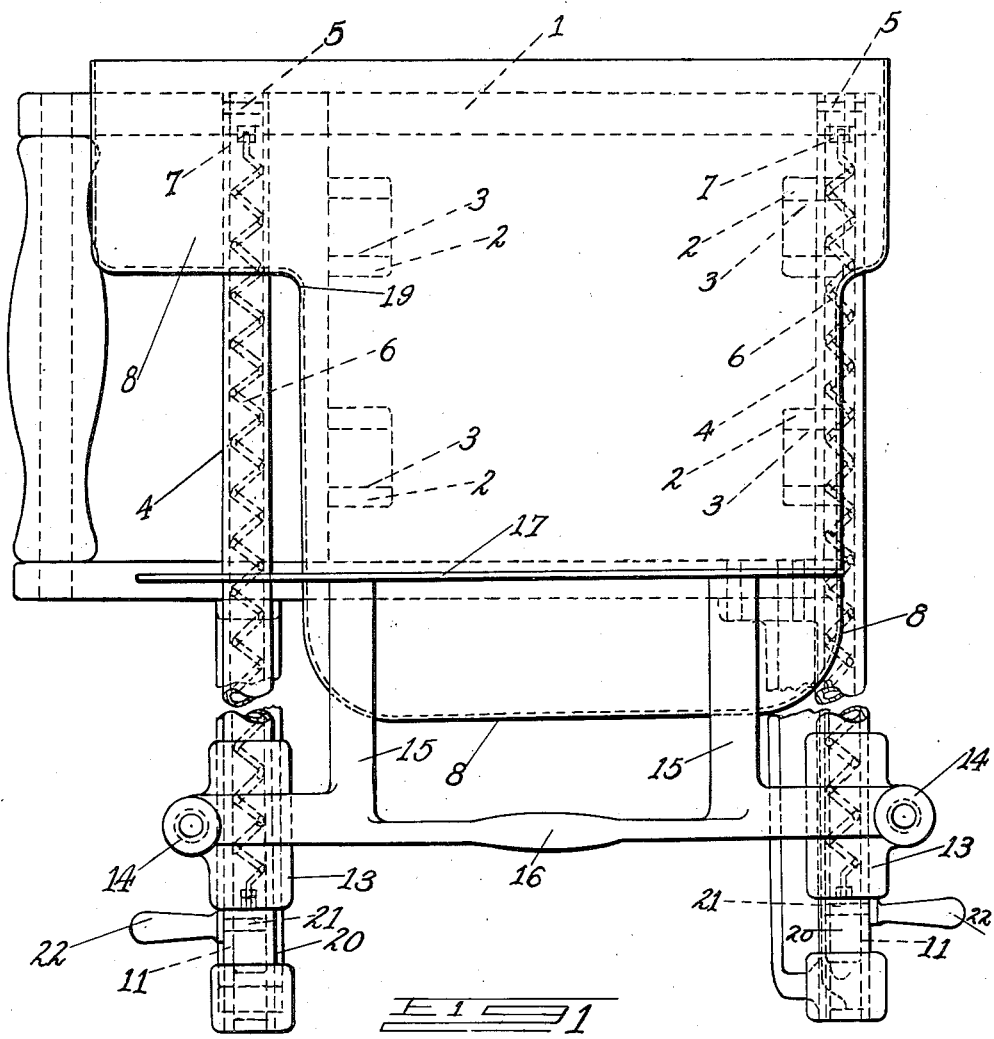

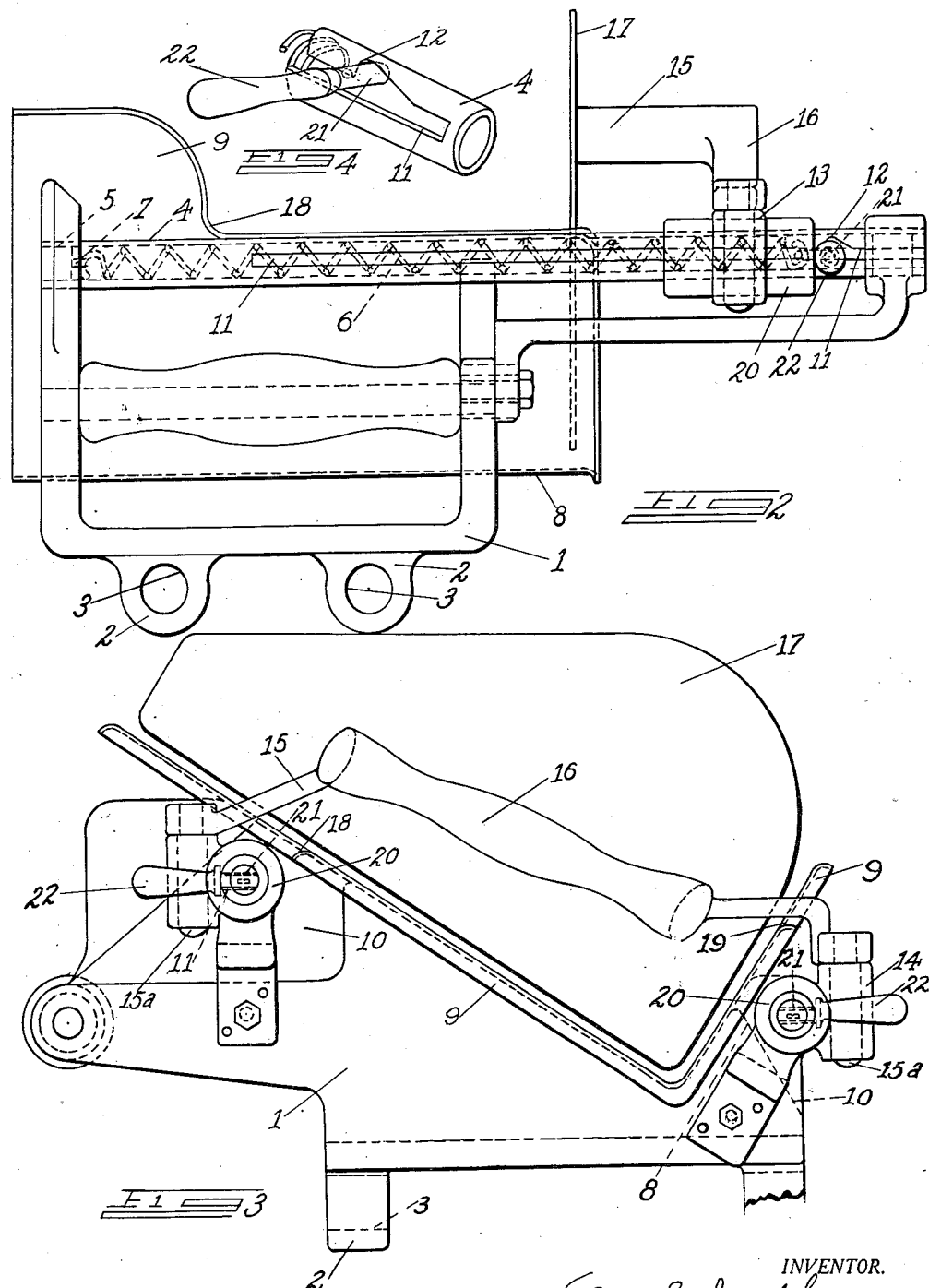

1,979,847

UNITED STATES PATENT OFFICE 1,979,847

MEAT SLICING MACHINE

Elmer G. Streckfuss, Cincinnati, Ohio, assignor to The Cincinnati Time Recorder Company, Cincinnati, Ohio, a corporation of Ohio Application December 1, 1928, Serial No. 323,163

8 Claims. (Cl. 146—102)

My invention relates to meat slicers and slicing machines of the type in which the material to be sliced is moved past a rotary knife, and the particular improvements to which my invention relates is concerned with the carriage for the material.

In the art, the provision of a rotary cutting knife with a carriage which reciprocates back and forth in such relation to the cutting knife as to cause slices of meat to be cut off consecutively, is well known. Further, the provision of a meat tray or support which may be manually operated on the carriage for advancing the meat or other material into contact with a gauge plate is old and well known. The use of a meat tray and pusher plate in combination with a carriage is particularly applied to slicers in which the meat is placed in the tray and is not securely clamped in position therein. If the meat is clamped on the carriage, mechanism may be employed for advancing the meat after each successive slice without the necessity of a gauge plate or a manually movable feed or pusher plate.

It is the object of my invention to provide, in a meat slicer in which the meat is supported on a tray and moved on a carriage past a rotary cutting knife, for mechanical means, preferably resilient, for pressing the meat on the tray forwardly or toward the gauge plate so that a constant pressure against the gauge plate may be had, as desired, and so that by shifting some of the parts of the mechanism associated with the tray and pusher plate, the plate may be released from control of the mechanical means, so that manual pressure may be applied thereto. It is further my object to so mount the pusher plate that it may be readily removed from its mounting so that an operator may apply direct manual pressure to the material.

While for some types of cutting work a constant resilient pressure for advancing the material is desirable, for other types of cutting, and for certain periods of cutting, it is desirable that the operator be able to manually control the feed of the meat. Thus it is the object of my invention to combine both a mechanical feed for a meat tray and a releasing device which will enable the operator to manually control the advance of the meat at such periods as he desires.

The above and other objects to which reference will be made in the ensuing disclosure I accomplish by that certain combination and arrangement of parts of which I have shown a preferred modification.

Referring to the drawings:—

Figure 1 is a plan view of the meat tray and carriage being shown disassociated from the meat cutting machine of which it forms a part.

Figure 2 is a side elevation of the meat tray and carriage shown in Figure 1.

Figure 3 is an end elevation of the meat tray and carriage shown in Figures 1 and 2.

Figure 4 is a detail perspective showing the end of one of the tubular supports for the feed or pusher plate with the bayonet lock for the mechanism which may be set to enable the operator to manually control the feed of the meat.

The carriage for the material which I will refer to as meat, although it should be understood that other materials may be used, is generally indicated at 1 and comprises a frame having bosses 2 with apertures 3 therein which engage rods which normally extend in alignment with the gauge and guard plate in a machine of the type described in my co-pending application Serial No. 205,772, filed July 14, 1927, which became Patent No. 1,760,670, on May 27, 1930.

Extending across between the frame members of the carriage I have shown two tubular members 4 having lugs 5 at the ends near the guide plate of the machine and with springs 6 extending through the tubes, the ends of the springs being secured in hooks 7 attached to the lugs or end supports 5. The meat tray is formed of a frame 8 having sides 9 and the tray is rigidly secured to the carriage frame as indicated at 10. The tubular members 4 have slots 11 extending substantially throughout their length which have bayonet slots 12 adjacent the ends of the slots.

Collars 13 are slidably mounted on the tubular members 4 and from the collars bosses 14 are extended, which, with the arms 15 and handle 16, form an assembly which is secured to the face plate 17, by the manual movement of which the handle may be advanced toward the gauge plate. The frame composed of the handle 16, the arms 15 and face plate 17 is mounted by means of pins 15a which extend within the bosses 14. To remove this frame all that is necessary is to lift up on the handle 16 when the pusher plate frame may be removed and the operator may then apply direct manual pressure as desired to the material being sliced. The sides of the tray are cut away as indicated at 18, 19 to allow clearance for the arms 15 during the advancement of the face plate.

Another set of collars 20 are mounted on the tubular members 4 and these collars are pulled inwardly along the members 4 and thereby push the face plate against the meat to advance it against the guide plate with each successive cut. The collars have guide pins 21 which extend through the slots 11 and the outer ends of the springs are secured to the guide pins. For inhibiting the spring pressure of the collars there are provided the bayonet slots 12 substantially at the ends of the slots 11 so that when the operator desires to advance the meat by hand he pulls the handles 22 which are extended from the ends of the guide pins 21 and secures the guide pins 21 within the bayonet slots.

The operation of the device will be apparent. During the operation of cutting a piece of meat the operator may either allow the pull of the springs to advance the face or pusher plate, or he may inhibit the spring pulled collars 20 and thereafter advance the face plate by hand.

While I have shown one specific modification of face plate with one particular structure which will enable an operator to inhibit the action of the springs, other suitable mechanical structure may be used to lock the spring mechanism so as to inhibit its operation.

It will be noted that the face plate or meat advancing device is pivoted at 14 on the sliding members 13. The fit of the pivoting and sliding means and the small resilience of the guides will permit the plate to take an angular position which is a decided advantage inasmuch as it can conform to the irregular back end of a piece of meat. So far as I am advised this is novel in meat advancing devices, and it contributes to the operation of the machine by imparting a firmer back support to the meat.

Having thus described my invention, what I claim as new and desire to secure by Letters Patent, is:—

1. In a slicing machine, in combination with a reciprocable carriage having a material supporting member thereon, a feeding device movable relative to said supporting member, resilient means for actuating said feeding device, and means for inhibiting said resilient means, said carriage having a pair of spaced tubular guides for said feeding device, said guides being slotted, and springs within said guides comprising said resilient means, guide pins extending through said slots, handles fixed to said guide pins, and said guides having bayonet slots adjacent their ends within which said guide pins may be placed.

2. In a slicing machine, a carriage having guides extending across the same, a tray for supporting material to be sliced, means guided on said guides tending to constantly urge material being sliced along said tray, and means for releasing said means for manual operation, said guides having slots therein and internal springs, and said means for constantly urging material being secured with said springs, said means for releasing said means located adjacent the ends of said guides, and comprising guide pins which may be secured in bayonet slots in said guides.

3. In a slicing machine comprising a carriage, and a guide on the carriage, a feeding device, a support for said feeding device guided on the guide, upright guide means on said support, on which said feeding device is mounted to be slid upwardly off of the support, a spring engaging said carriage and having a part active to feed said support along its guide, and means to restrain said part to allow said support, carrying said feeding device, to be fed along its guide independently of the spring action.

4. In a slicing machine comprising a carriage, and a tubular longitudinally slotted guide on said carriage, a feeding device guided on said guide, a spring contained in said guide and engaging said carriage, a part engaged by said spring, extending through the slot of said guide and active to feed said feeding device therealong, said slotted guide having a notch communicating with its slot to receive and restrain said part that is engaged by said spring, to allow said feeding device to be fed along said guide independently of the spring action.

5. In a slicing machine, a feeding device comprising parallel guides, supports individually slidable along the respective guides, and a material-contacting member pivoted to the respective supports whereby its angle of contact with the material may be altered by sliding said supports different distances along said guides.

6. In a slicing machine, a feeding device comprising parallel guides, supports individually slidable along the respective guides, pins extending up from the respective supports, and a material-contacting member pivoted on said pins whereby its angle of contact with the material may be altered by sliding said supports different distances along said guides, said member being slidable upwardly off of said pins.

7. In a slicing machine, a feeding device comprising parallel guides, supports individually slidable along the respective guides, springs acting individually on said supports to urge the supports along the guides, and a material-contacting member pivoted to the respective supports whereby its angle of contact with the material may be altered by sliding said supports different distances along said guides.

8. In a slicing machine, a feeding device comprising parallel guides, supports individually slidable along the respective guides, springs acting individually on said supports to urge the supports along the guides, a material-contacting member pivoted to the respective supports whereby its angle of contact with the material may be altered by sliding said supports different distances along said guides, and means for inhibiting said springs to permit free sliding of said member under manual actuation.

ELMER G. STRECKFUSS.